Oct. 14, 1952 J. O. KLEIN 2,613,948
VEHICLE COUPLING
Filed July 7, 1950 2 SHEETS—SHEET 1
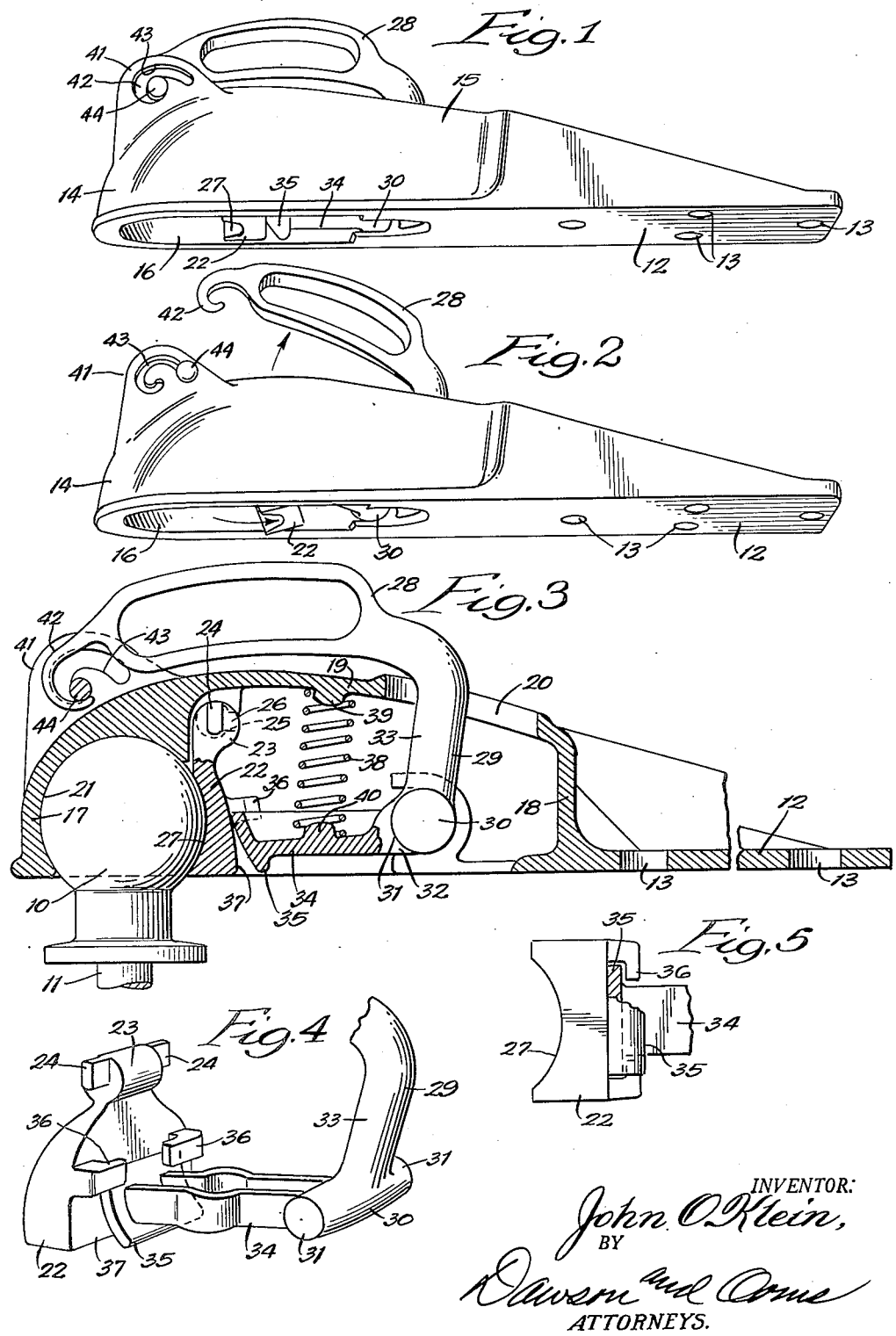
INVENTOR:
John O. Klein,
BY
Dawson and Ome
ATTORNEYS.

Oct. 14, 1952 J. O. KLEIN 2,613,948
VEHICLE COUPLING
Filed July 7, 1950 2 SHEETS—SHEET 2
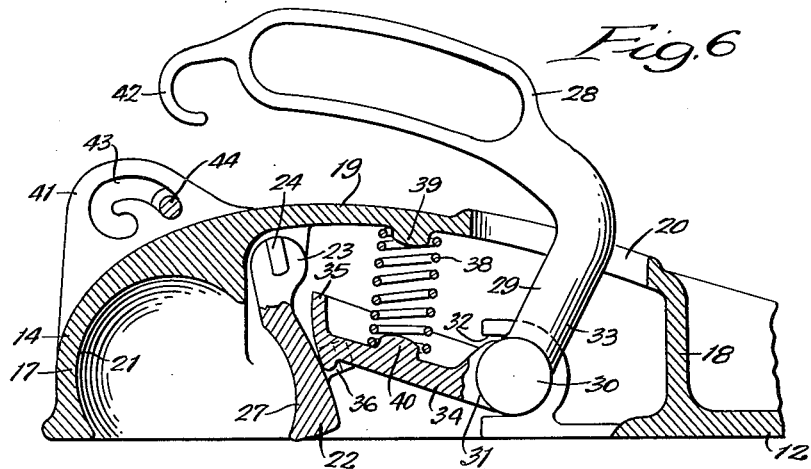
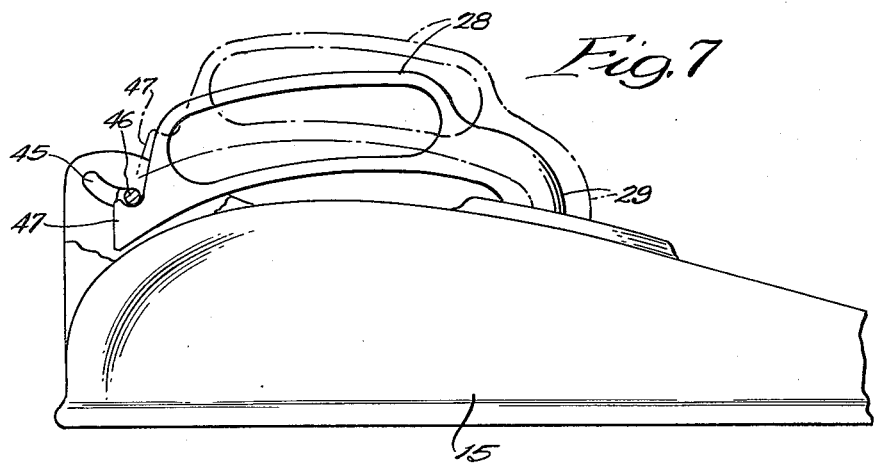
INVENTOR:
John O. Klein,
BY
Dawson and Ooms
ATTORNEYS.

Patented Oct. 14, 1952

2,613,948

UNITED STATES PATENT OFFICE 2,613,948

VEHICLE COUPLING

John O. Klein, Lufkin, Tex., assignor to Texas Foundries, Inc., Lufkin, Tex., a corporation of Texas Application July 7, 1950, Serial No. 172,450

7 Claims. (Cl. 280—33.17)

This invention relates to a coupling assembly for use in establishing a driving relation or an operative connection between two vehicles, such as between a truck and a trailer or between an automotive vehicle and a trailer, machine, sleigh, and other wheeled or movable vehicles.

It is an object of this invention to produce a coupling assembly of the type described which is strong and durable, which may be easily and quickly mounted on the particular vehicle body for use in establishing the desired driving connection, which is formed of relatively few simple parts that are easily and simply operated to effect the hitched or unhitched relation and which in its operative position establishes a positive connection that resists inadvertent disconnection.

Another object is to produce a trailer hitch of the type described which is of pinless construction and has automatic latching features and means for positively locking the parts in their mounted relation and which has little, if any, play in the parts and, therefore, is not subject to rattling noise characteristic of present constructions.

These and other objects and advantages of this invention will hereinafter appear and for purposes of illustration but not of limitation, embodiments of this invention are shown in the accompanying drawing, in which Figure 1 is a perspective view of a coupling member embodying features of this invention;

Figure 2 is a perspective view of the coupling member shown in Figure 1 with the parts actuated to a position for coupling or uncoupling the assembly;

Figure 3 is an elevational view partially in section showing the arrangement of parts in their coupled relation with a ball member;

Figure 4 is a perspective elevational view showing the arrangement of parts for operating the backing plate toward coupling or uncoupling position;

Figure 5 is a fragmentary view partially in section of the box cam member by which the backing plate is operated between its positions of adjustment;

Figure 6 is a fragmentary view partially in section of the arrangement of parts shown in Figure 2; and Figure 7 is an elevational view showing a modified form of locking means for securing the actuating handle in its coupled relation.

In accordance with this invention, a coupling member for establishing a driving relation between two vehicles is adapted to be mounted on one of the vehicles for connection to a ball member secured to the other vehicle. The coupling member includes a housing, a portion of which provides part of a ball socket for receiving the ball in seating relation when in operative position, and co-operating with said housing part is a swinging backing plate that is mounted for pendulant movement within the housing in the direction towards and away from said ball receiving part to provide a socket in which the ball member is firmly held when in a coupled relation. When the backing plate is adjusted to another or uncoupling position of adjustment, the ball member may be moved into and out of the socket space. When in the former position, the backing plate is said to be in coupling position. While in the latter position, the backing plate is in uncoupling position.

An operating handle is provided adjacent the exterior of the housing for rocking the backing plate between the two positions of adjustment. The handle is operatively connected to the backing plate by co-operating guide and cam means. Other means are provided for releasably locking the handle in place when the parts are in coupling position and means are also provided for constantly urging the parts toward their coupling position and also for establishing a tensioned relation which minimizes looseness or rattling noises.

The coupling member embodying features of this invention is adapted to be used with a ball member 10 extending from a carriage-type bolt and nut 11 by which the ball member is rigidly secured to one of the traction vehicles, such as to the rearward end portion of the drawing vehicle.

The coupling part embodying features of this invention is formed of a one-piece shoe having a relatively flat base plate 12 at one end in which spaced openings 13 are formed for securing the shoe to the tongue of the vehicle being drawn. Forwardly of the base plate is an elongated housing 14 having side walls 15 and 16, front and rear walls 17 and 18 respectively, and a top wall 19 having an elongated slot 20 in the rearward portion thereof.

The inner surface 21 of the front wall and the adjacent surfaces of the side walls 15 and 16 are of curvilinear shape to conform to the peripheral surface of the ball 10 to provide a bearing seat for the ball when securing in coupled relation. The ball 10 is held in its seated relation in a manner to prevent inadvertent movement such as might permit uncoupling by a backing plate 22 pivoted at its upper end 23 for swinging or pendulant movement in the direction toward and away from the front wall 17. The pivot is established by studs 24 which project sidewise from the backing plate 22 and seat within receiving grooves or openings 25 in the adjacent portions of the side walls 15 and 16. A slot 26 is contiguous with the grooves to permit the studs to be inserted therethrough toward their pivoted relation. The forward surface 27 of the backing plate is also formed of curvilinear shape conforming to the contour of the ball member so that, when in coupling position, it co-operates with the front and side wall portions to form a ball-receiving socket in which the ball member is free to turn as in a universal joint. When the backing plate is swung away from the front wall toward uncoupling position, the ball member 10 may be moved into and out of the socket space.

The backing plate 22 is adapted to be actuated between coupling and uncoupling positions of adjustment by a handle 28 which is arranged over the top wall 19 of the housing and is operatively connected to a bell-crank lever 29 pivoted at its fulcrum 30. Studs or lugs 31 extending laterally from the heel of the bell-crank lever turn in forwardly extending grooves 32 formed by flanges extending inwardly from the side walls in the near vicinity of the back wall 18. An upwardly extending arm 33 of the bell-crank lever 29 reaches through the slot 20 and is joined to the rearward portion of the handle 28.

The forward end portion of the horizontally disposed arm 34 of the bell-crank lever is provided with a vertically disposed and laterally extending curvilinear flanged actuating member or cam 35, preferably having its center of curvature at a point upwardly and forwardly of the pivot for the bell-crank lever. The flanged portion 35 is slidable through laterally spaced, hooked guides 36 or box cams which extend rearwardly as laterally spaced ears from the back wall 37 of the backing plate 22. For most effective use, it is best to have the center of curvature of the flange member or cam 35 above a line drawn between the pivot of the bell-crank lever and the center of the ball socket.

The bell-crank lever 29 is constantly urged in the direction to actuate the backing plate toward coupling position by a coil spring 38 arranged within the housing between the top wall 19 and the arm 34 of the bell-crank lever. Studs 39 and 40 are provided in the respective surfaces to hold the spring member in proper position. It will be understood that other means well known in the art may be employed for constantly urging the parts of the coupling assembly toward their normal coupled relation. Such resilient means not only minimizes the possibility of inadvertent disengagement of the parts from their coupled relation, but it tensions the parts sufficiently to eliminate looseness and consequent rattling noises when in position of use.

In order to prevent inadvertent disengagement between the coupled members as an incidence to normal use, locking means are provided for manual release of secured parts when in their coupled relation. A preferred locking arrangement includes a pair of spaced ears 41 extending upwardly from the forward end portion of the top wall 19 and between which a hooked end 42 projecting forwardly from the handle 28 is adapted to be disposed when the parts are in their normal coupled relation.

In the embodiment shown in Figs. 1 to 6, the ears 41 are provided with registering slots 43 having a shape corresponding to an inclined J. A floating pin 44 extends through the slots and is provided with flanged end portions to prevent removal from the slots. The hooked portion 42 on the forward end of the handle 28 is adapted to lie partially beneath the forward portion of the slot 43 when the parts are in their coupled relation so as to be engaged by the pin 44 to prevent upward movement of the handle. By reaction with the upturned portion on the end of the slot 43, any upward force on the handle will merely force the pin to seat more firmly within said upturned portion to resist such movement. To unlock the handle, the pin is shifted forwardly and up and then into the rearward portion of the slot 43 so as to release the hooked end 42 and permit the handle 28 to be rocked in the vertical direction.

Instead of the arrangement described, the slotted portion in the ears 41 may be a short curvilinear inclined slot 45, as shown in Figure 7 and in which a pin 46 is also slidable. In this modification the handle 28 is provided with a forwardly extending grooved portion which is adapted to rest below the lower inner end of the slot 45 whereby locking engagement is established between the hooked end portion 47 of the handle and the pin when seated in the rearmost portion of the slot 45. For unlatching, the pin may be shifted toward the forward portion of the slot so as to release the handle 28 for rocking movement. The slotted portions described in each of the modifications permit the use of a padlock or the like extending through the slotted portions to prevent such movement of the pin as will permit uncoupling of the parts.

In operation, the handle member 28 is lifted as shown by the dotted line in Figure 7 or as shown in Figures 2 and 6. Responsive to such lifting movement, the bell crank lever 29 is turned in a clockwise direction about its pivot whereby the flanged member 35 is raised. Responsive to the reaction between the engaging surfaces of the flanged member 35 and the box cams or hooked guides 36, the backing plate 22 is rocked rearwardly about its pivot toward uncoupling position of adjustment.

While in this position, the mouth of the socket area is sufficiently enlarged to permit the ball 10 to be moved into the socket area. Upon release of the handle portion 28, the tensioned spring 38 causes the bell crank lever to be rocked about its pivot in a counter-clockwise direction. The resulting reaction between the flanged member 35 and the hooked guides 36 as well as the reaction between the curvilinear outer wall of the flange member 35 and the rear wall of the backing plate 22 causes the backing plate to be rocked forwardly to its coupling position. In this position, a socket is formed in which the ball 10 snugly fits to permit universal movement in a manner desired for such moving vehicles. The parts may be locked in the position described by movement of the pin 44 into the forward lower end portion of the slot 43. The coil spring 38 operates further, as described, to urge the parts toward their coupled position with sufficient force to minimize looseness and resulting rattling noises and its also serves to hold the parts in their assembled relation and permit a construction without the need for pins, bolts, locking nuts or the like.

For the purpose of uncoupling the parts, the pin 44 may be adjusted toward the rearward portion of the slot so as to release the hooked end 42 of the handle. The handle 28 may then be manually raised to effect rearward swinging movement of the backing plate 22 toward uncoupling position.

It will be understood that numerous changes may be made in the details of construction, arrangement and operation without departing from the invention, especially as defined in the following claims.

I claim:

1. A coupling member for establishing a driving relation between one vehicle and another having a ball member comprising a housing, a backing plate mounted for pendulant movement within the housing between a coupling position forming a ball socket in co-operation with a portion of the housing and uncoupling position wherein the mouth of the socket is enlarged to permit adjustment of the ball member into and out of the socket area, a bell crank pivot on its fulcrum within the housing, a box cam arrangement including a pair of laterally spaced hooked guides on the backing plate and a curvilinear flange on the end of one arm of the bell crank in sliding engagement within the hooked guides, and a handle connected to the other arm of the bell crank for rocking same about its fulcrum.

2. A coupling member as claimed in claim 1 in which a curvilinear flanged portion on the end of one arm of the bell crank is formed with the center of the curvilinear portion located forwardly and above the pivot point of the bell crank.

3. A coupling member for establishing a driving relation between one vehicle and another having a ball member comprising a housing, a backing plate mounted for pendulant movement within the housing between a coupling position forming a ball socket in co-operation with a portion of the housing and uncoupling position wherein the mouth of the socket is enlarged to permit movement of the ball member into and out of the socket area, a bell crank pivoted on its fulcrum within the housing, a curvilinear flange on one arm of the bell crank having its center located forwardly and above the pivot point of the bell crank and above a line drawn from the pivot to the center of the socket area, hooked flanges having inturned ends spaced a short distance from the back of the backing plates to provide space grooves in which the curvilinear flanges operate to effect pendulant movement of the backing plate responsive to rocking movement of the bell crank about a pivot and a handle rigid with the other arm of the bell crank.

4. A coupling member as claimed in claim 3 in which locking means are provided for releasably securing the handle in position when the backing plate is in coupling position.

5. A coupling member as claimed in claim 4 in which said locking means comprises spaced flanges projecting from the outer wall of the housing, inclined slots formed in each flange, a pin slidable through said slots, and a hooked portion on the end of the handle which extends between said flanges when the parts are in coupling position for engagement with said pin to establish a latching relation.

6. A coupling member for establishing a driving relation between a pair of vehicles one of which is provided with a ball member, said coupling member comprising a housing, a backing plate mounted for pendulant movement within the housing between one position for holding the ball member for coupled relation within the housing and another position permitting movement of the ball member into and out of its coupled relation, an operating handle, guide members fixed to the rear wall of the backing plate to provide guide slots between said guide members and the rear wall of the backing plate, a curvilinear cam plate operated by the handle for swinging movement through the guide slots for controlling pendulant movement of the backing plate, and latching means for securing the handle in position to secure the parts in coupled relation.

7. A coupling member as claimed in claim 6 in which spring means are provided constantly to urge the cam plate in the direction for positioning the backing plate into position for holding the ball member in coupled relation.

JOHN O. KLEIN.

REFERENCES CITED

The following references are of record in the file of this patent:

UNITED STATES PATENTS

| Number | Name | Date |
|---|---|---|
| 625,171 | Ladd et al. | May 16, 1899 |
| 1,757,009 | Dumond | May 6, 1930 |
| 2,070,884 | Claus | Feb. 16, 1937 |
| 2,125,611 | Hennicke | Aug. 2, 1938 |